(12) United States Patent
de Oliveira et al.

(10) Patent No.: US 9,126,848 B2
(45) Date of Patent: Sep. 8, 2015

(54) SYNTHESIS OF NANOPARTICLES BY MEANS OF IONIC LIQUIDS

(75) Inventors: Peter William de Oliveira, Saarbruecken (DE); Hechun Lin, Saarbruecken (DE); Michael Veith, St.-Ingbert (DE)

(73) Assignee: Leibniz-Insitut fuer Neue Materialien gemeinnuetzige GmbH, Saarbrueken (DE)

( * ) Notice: Subject to any disclaimer, the term of this patent is extended or adjusted under 35 U.S.C. 154(b) by 143 days.

(21) Appl. No.: 13/517,266

(22) PCT Filed: Dec. 15, 2010

(86) PCT No.: PCT/EP2010/007634
§ 371 (c)(1),
(2), (4) Date: Jun. 20, 2012

(87) PCT Pub. No.: WO2011/079908
PCT Pub. Date: Jul. 7, 2011

(65) Prior Publication Data
US 2012/0275991 A1 Nov. 1, 2012

(30) Foreign Application Priority Data
Dec. 29, 2009 (DE) .......... 10 2009 060 835

(51) Int. Cl.
| | | |
|---|---|---|
| C01G 23/00 | (2006.01) | |
| C01G 23/04 | (2006.01) | |
| C01G 3/02 | (2006.01) | |
| C01G 39/02 | (2006.01) | |
| C01G 41/02 | (2006.01) | |
| C01G 25/02 | (2006.01) | |
| C01G 19/02 | (2006.01) | |
| C01G 21/02 | (2006.01) | |
| C01G 9/02 | (2006.01) | |
| C01G 49/02 | (2006.01) | |
| C01G 31/02 | (2006.01) | |
| B82Y 30/00 | (2011.01) | |
| C01G 1/02 | (2006.01) | |

(52) U.S. Cl.
CPC ............... *C01G 25/02* (2013.01); *B82Y 30/00* (2013.01); *C01G 1/02* (2013.01); *C01G 3/02* (2013.01); *C01G 9/02* (2013.01); *C01G 19/02* (2013.01); *C01G 21/02* (2013.01); *C01G 23/04* (2013.01); *C01G 31/02* (2013.01); *C01G 39/02* (2013.01); *C01G 41/02* (2013.01); *C01G 49/02* (2013.01); *C01P 2002/72* (2013.01); *C01P 2004/04* (2013.01); *C01P 2004/64* (2013.01); *C01P 2006/12* (2013.01)

(58) Field of Classification Search
CPC .......... C01G 3/02; C01G 39/02; C01G 41/02; C01G 25/02; C01G 19/02; C01G 21/02; C01G 9/02; C01G 23/04; C01G 49/02; C01G 31/02
USPC .......... 423/604, 606, 608, 618, 619, 622, 610, 423/624, 625, 632, 635, 594.17
See application file for complete search history.

(56) References Cited

U.S. PATENT DOCUMENTS

| | | |
|---|---|---|
| 7,901,657 B2 | 3/2011 | Arpac et al. |
| 2007/0059544 A1* | 3/2007 | Xiong et al. .................. 428/506 |
| 2008/0134939 A1 | 6/2008 | Arpac et al. |
| 2009/0014062 A1* | 1/2009 | Kayama et al. ............... 136/256 |
| 2010/0051877 A1* | 3/2010 | Wei et al. .................... 252/408.1 |

FOREIGN PATENT DOCUMENTS

| | | |
|---|---|---|
| CN | 101 475 222 A | 7/2009 |
| CN | 101475222 | 7/2009 |
| JP | 2001262007 A | 9/2001 |
| JP | 2006130507 A | 5/2006 |
| WO | 2009079713 A1 | 7/2009 |

OTHER PUBLICATIONS

English abstract of CN 101475222.
Yoo, Kyesang, et al., "Ionic Liquid Assisted Preparation of Nanostructured TiO2 Particles", Chemical Communications, 2004, 17, 2000-2001.
English Abstract of JP 2001262007 (Sep. 26, 2001).
English Abstract of JP 2006130507 (May 25, 2006).
Translation of International Preliminary Report on Patentability, dated Jul. 19, 2012.
Hu, S., et al., "Synthesis of Mesostructure Anatase TiO2 Particles in Room-Temperature Ionic Liquids," Material Letters 62 (2008), 2954-56.
Brown et al., "New catanionic surfactants with ionic liquid properties", Journal of Colloid and Interface Science, 395 (2013) 185-189.

\* cited by examiner

*Primary Examiner* — Matthew E Hoban
*Assistant Examiner* — James Fiorito
(74) *Attorney, Agent, or Firm* — Cahn & Samuels, LLP

(57) ABSTRACT

A method for producing nanoscale particles by means of ionic liquids produces highly crystalline particles. The ionic liquids can be easily regenerated.

13 Claims, 10 Drawing Sheets

SYNTHESIS OF NANOPARTICLES BY MEANS OF IONIC LIQUIDS

This patent application is a U.S. national stage application of PCT international application PCT/EP2010/007634 filed on 15 Dec. 2010 and claims priority of German patent document 10 2009 060 835.4 filed on 29 Dec. 2009, the entirety of which is incorporated herein by reference.

FIELD OF THE INVENTION

The invention relates to a method for producing nanoscale particles.

BACKGROUND OF THE INVENTION

In the prior art there are many techniques known for producing nanoparticles in sol-gel methods (DE 10 2004 009 287 A1). With these methods it is possible to obtain nanoparticles in good quality. However, these methods are often multistage and necessitate, for example, the addition of catalysts, which lead to impurities in the product.

The methods which use ionic liquids usually do not allow regeneration or repeated use of the ionic liquids.

It is an object of the invention to specify a method which enables production of nanoscale particles in just a few steps. The ionic liquids used ought to be able to be used repeatedly. In view of the high price of ionic liquids, the method ought to manage with as little ionic liquid as possible.

SUMMARY OF INVENTION

This object is achieved by the inventions having the features of the independent claims. Advantageous developments of the inventions are characterized in the dependent claims. The wording of all of the claims is hereby, by reference, made part of the content of this description. The invention also encompasses all rational—and more particularly all stated—combinations of independent and/or dependent claims.

The invention concerns a method for producing nanoscale particles.

In the text below, individual method steps are described in more detail. The steps need not necessarily be carried out in the order stated, and the method to be outlined may also feature further steps not stated.

In a first step, a composition comprising a hydrolyzable metal compound, at least one ionic liquid, and a compound having at least one hydroxyl group is prepared.

In a further embodiment of the invention, the hydrolyzable metal compound is at least one compound of the general formula (I)

where M is a metal and X is a hydrolyzable group, which may be the same or different, it being possible for two groups X to be replaced by a bidentate hydrolyzable group or by an oxo group, or for three groups X to be replaced by a tridentate hydrolyzable group, and n corresponds to the valence of the element and is frequently 3 or 4.

With advantage, M is selected from the group containing Mg, B, Al, Ga, In, Si, Ge, Sn, Pb, Y, Ti, Zr, V, Nb, Ta, Mo, W, Fe, Cu, Ag, Zn, Cd, Ce, and La, preferably Al, B, Si, Pb, Ti, Zr, more preferably Ti and Zr. Ti is of particular interest on account of the formation of photocatalytically active $TiO_2$ particle.

In the compound of the formula (I), at least one hydrolyzable group X is lipophilic. Preferably all groups X of the formula (I) are lipophilic. Lipophilic groups have preferably a saturated, unsaturated or aromatic, branched or unbranched hydrocarbon radical having at least four and preferably at least five carbon atoms.

Examples of preferred alkoxy groups are $C_4$-$C_{20}$ alkoxy, preferably $C_4$-$C_{10}$ alkoxy, such as n-butoxy, isobutoxy, sec-butoxy, tert-butoxy, linear or branched pentoxy, hexoxy, heptoxy or octoxy, such as 2-ethylhexoxy, cyclohexyloxy. The alkoxy group may be branched or, preferably, linear; one advantageous branched alkoxy group is 2-ethylhexoxy, for example. Examples of alkenyloxy groups are $C_4$-$C_{20}$ alkenyloxy, preferably $C_4$-$C_{10}$ alkenyloxy, such as butenoxy, pentenoxy, hexenoxy, heptenoxy, octenoxy, and higher alkenoxy groups, with pentenyl and hexenyl being preferred, e.g., $CH_3CH_2CH=CHCH_2CH_2O-$ or $CH_2=CH(CH_2)_4O-$. The alkenyloxy group may be branched or, preferably, linear; the double bond may be in any position. It is also possible for there to be more than one double bond. Examples of alkynyloxy groups are $C_4$-$C_{20}$ alkynyloxy, preferably $C_4$-$C_{10}$ alkynyloxy, such as pentynyloxy or hexynyloxy.

Lipophilic aryloxy, aralkyloxy, and alkaryloxy groups may have for example 6 to 20, preferably 6 to 15, carbon atoms. Examples are phenyloxy, naphthyloxy, tolyloxy, and benzyloxy. Suitable lipophilic, hydrolyzable ether groups have, for example, the general formula $R^1(-OR^2)_xO-$, in which $R^1$ is a lipophilic alkyl group, $R^2$ is an alkylene group, e.g., having 1 to 4 carbon atoms, such as ethylene or propylene, and x is an integer from 1 to 4, preferably 1 or 2. The group $R^1$ is preferably a $C_4$-$C_{20}$ alkyl group, such as butyl, pentyl, hexyl, cyclohexyl, heptyl or octyl. Specific examples are butoxyethoxy and hexoxyethoxy.

Examples of acyl groups are $C_4$-$C_{20}$ acyl, preferably $C_4$-$C_{10}$ acyl, such as butyryl, valeroyl, and caproyl ($C_6$ acyl). Examples of acyloxy groups, where hydrolysable, are $C_4$-$C_{20}$ acyloxy, preferably $C_4$-$C_{10}$ acyloxy, such as butyryloxy, valeroyloxy, and caproyloxy. Alkyl groups, where hydrolysable, have for example 4 to 20, preferably 4 to 10, carbon atoms. Examples are the groups $R^1$ stated above for the ethers.

Further examples of hydrolyzable groups X are, for example, halogen (F, Cl, Br or I, more particularly Cl and Br), $C_{1-4}$ alkoxy, such as, e.g., ethoxy, n-propoxy, isopropoxy, n-butoxy, $C_{1-3}$ acyloxy, such as, e.g., acetoxy or propionyloxy, $C_1$-$C_3$ alkenyloxy, such as vinyl or allyloxy, $C_1$-$C_3$ alkynyloxy or $C_2$-$C_3$ alkylcarbonyl, such as, e.g., acetyl.

Examples of hydrolyzable compounds having preferred lipophilic groups are, for example, $Al(O-n-C_4H_9)_3$, $Al(O-sec-C_4H_9)_3$, $Al(OC_2H_4OC_4H_9)_3$, $Ti(OC_4H_9)_4$, $Ti(pentoxy)_4$, $Ti(hexoxy)_4$, $Ti(2-ethylhexoxy)_4$, $Zr(OC_4H_9)_4$, $Zr(pentoxy)_4$, $Zr(hexoxy)_4$, $Zr(2-ethylhexoxy)_4$, and also Zr compounds which contain complexing radicals, such as, for example, β-diketone radicals and (meth)acrylic radicals, $Si(OC_4H_9)_4$, where the stated pentoxy and hexoxy radicals may be linear or branched.

Examples of further hydrolyzable compounds are $Al(OCH_3)_3$, $Al(OC_2H_5)_3$, $Al(O-n-C_3H_7)_3$, $Al(O-i-C_3H_7)_3$, $AlCl_3$, $AlCl(OH)_2$, $Ti(OCH_3)_4$, $Ti(OC_2N_5)_4$, $TiCl_4$, $Ti(OC_2H_5)_4$, $Ti(O-n-C_3H_7)_4$, $Ti(O-i-C_3H_7)_4$, $ZrCl_4$, $Zr(OC_2H_5)_4$, $Zr(O-n-C_3H_7)_4$, $Zr(O-i-C_3H_7)_4$, $ZrOCl_2$, boric acid, $BCl_3$, $B(OCH_3)_3$, $B(OC_2H_5)_3$, $SnCl_4$, $Sn(OCH_3)_4$, $Sn(OC_2H_5)_4$, $Si(OOCCH_3)_4$, $VOCl_3$, and $VO(OCH_3)_3$, $Si(OCH_3)_4$, $Si(OC_2H_5)_4$, $Si(O-n-$ or $i-C_3H_7)_4$, $SiCl_4$ and $HSiCl_3$.

Compounds having aforementioned hydrolyzable groups that are not lipophilic may be used as starting compounds for the preparation of compounds having lipophilic hydrolyzable groups.

The hydrolyzable compounds having the stated lipophilic hydrolyzable groups may be available commercially. They may also be prepared from other hydrolyzable compounds, by means of substitution reactions, for example. This may be expedient, for example, if other hydrolyzable compounds are more easily available. Thus, for example, a metal alkoxide or semi-metal alkoxide, such as a metal ethoxide or metal propoxide, may be reacted with a higher alcohol, e.g., pentanol, hexanol or 2-ethylhexanol, in order to replace the alkoxy group of the alkoxide by the alkoxy group of the higher alcohol. The substitution reaction may be carried out completely or only partially. A substitution reaction of this kind may also be used in order to form the desired compounds having hydrolyzable, lipophilic groups from other hydrolyzable compounds in situ and in order to react them directly, without isolation, to give the desired particles.

The hydrolyzable metal compounds or semi-metal compounds, e.g., those of the formula (I) above, may also contain complexing radicals, such as β-diketone radicals and (meth)acrylic radicals, for example. Particularly in the case of the more reactive alkoxides (e.g., of Al, Ti, Zr, etc.), it may be advisable under certain circumstances to use them in a complexed form, in which case examples of suitable complexing agents are unsaturated carboxylic acids and β-dicarbonyl compounds, such as methacrylic acid, acetylacetone, and ethyl acetoacetate, for example.

It is also possible to use hydrolyzable compounds which contain at least one nonhydrolyzable group. Examples are silanes of the general formula $$R_a SiX_{(4-a)} \quad (II),$$

in which the radicals R are identical or different and represent nonhydrolyzable groups, the radicals X are identical or different and denote hydrolyzable groups or hydroxyl groups, and a has the value 1, 2 or 3, or an oligomer derived therefrom. The value of a is preferably 1 or 2.

In the general formula (II)) the hydrolyzable groups X, which may be identical to or different from one another, are, for example, hydrogen or halogen (F, Cl, Br or I), alkoxy (preferably $C_{1-6}$ alkoxy, such as, e.g., methoxy, ethoxy, n-propoxy, isopropoxy and butoxy), aryloxy (preferably $C_6$-$C_{10}$ aryloxy, such as, e.g., phenoxy), acyloxy (preferably $C_{1-6}$ acyloxy, such as, e.g., acetoxy or propionyloxy), alkylcarbonyl (preferably $C_{2-7}$ alkylcarbonyl, such as, e.g., acetyl), amino, monoalkylamino or dialkylamino having preferably 1 to 12, more particularly 1 to 6, carbon atoms. Preferred hydrolyzable radicals are halogen, alkoxy groups (more particularly ethoxy and methoxy), and acyloxy groups. Where hydrolyzable lipophilic groups are to be introduced into the nanoparticles using a silane of the formula (II)), X may be one of the hydrolyzable lipophilic groups described above, in connection, for example, with the compounds of the formula (I).

In accordance with the invention the composition comprises at least one ionic liquid. This term is applied to salts, usually having at least one organic component, which are liquid at temperatures of below 100° C., preferably room temperature. Through a suitable choice of the combination of cations and anions it is possible to set the properties of the ionic liquid in accordance with the desired properties, such as, for example, viscosity, solubility of the components, thermal or photochemical stability, density, melting point, polarity or hydrophobicity, within a wide range.

Since the majority of ionic liquids are neither flammable nor possess a measurable vapor pressure, they are already being used in numerous reactions as a replacement for or addition to conventional solvents.

The ionic liquid or the ionic liquids preferably correspond to the general formula $K^+ A^-$.

The cations ($K^+$) are preferably selected from the group of ammonium, phosphonium, uronium, thiouronium, guanidinium cations or heterocyclic cations.

Ammonium cations which may be selected are cations corresponding to the general formula (1)

$$[NR_4]^+$$

where

R independently at each occurrence is H, with the proviso that not less than two substituents R in formula (1) are H, OR', NR'$_2$, with the proviso that not more than one substituent R in formula (1) is OR', NR'$_2$, straight-chain or branched alkyl having 1-20 C atoms, straight-chain or branched alkyl having 2-20 C atoms and one or more double bonds, straight-chain or branched alkyl having 2-20 C atoms and one or more triple bonds, saturated, partly or wholly unsaturated cycloalkyl having 3-7 C atoms, and being able to be substituted by alkyl groups having 1-6 C atoms, where one or more R may be substituted partly or wholly by halogens, or partly by —OH, —OR', —CN, —C(O)OH, —C(O)NR'$_2$, —SO$_2$NR'$_2$, —SO$_2$OH, —NO$_2$, and where one or more nonadjacent and non-α-located carbon atoms of the R may be replaced by atoms and/or atomic moieties selected from the group —O—, —S—, —S(O)—, —SO$_2$—, —C(O)—, —C(O)O—, —N$^+$R'$_2$—, —P(O)R'O—, —C(O)NR'—, —SO$_2$NR'—, —OP(O)R'O—, —P(O) (NR'$_2$)NR'—, —PR'$_2$═N— or —P(O)R'—, with R' being able to be H, unfluorinated, partly fluorinated, or perfluorinated $C_1$ to $C_6$ alkyl, $C_3$ to $C_7$ cycloalkyl, unsubstituted or substituted phenyl.

Phosphonium cations which may be selected are cations corresponding to the general formula (2)

$$[PR^2_4]^+$$

where

R independently at each occurrence is H, OR', NR'$_2$, straight-chain or branched alkyl having 1-20 C atoms, straight-chain or branched alkyl having 2-20 C atoms and one or more double bonds, straight-chain or branched alkyl having 2-20 C atoms and one or more triple bonds, saturated, partly or wholly unsaturated cycloalkyl having 3-7 C atoms, and being able to be substituted by alkyl groups having 1-6 C atoms, where one or more $R^2$ may be substituted partly or wholly by halogens, or partly by —OH, —OR', —CN, —C(O)OH, —C(O)NR'$_2$, —SO$_2$NR'$_2$, —SO$_2$OH, —NO$_2$, and where one or more nonadjacent and non-α-located carbon atoms of the $R^2$ may be replaced by atoms and/or atomic moieties selected from the group —O—, —S—, —S(O)—, —SO$_2$—, —C(O)—, —C(O)O—, —N$^+$R'$_2$—, —P(O)R'O—, —C(O)NR'—, —SO$_2$NR'—, —OP(O)R'O—, —P(O) (NR'$_2$)NR'—, —PR'$_2$═N— or —P(O)R'—, with R' being H, unfluorinated, partly fluorinated, or perfluorinated $C_1$ to $C_6$ alkyl, $C_3$ to $C_7$ cycloalkyl, unsubstituted or substituted phenyl.

Uronium cations which may be selected are cations corresponding to the general formula (3)

$$[(R^3 R^4 N)-C(=OR^5)(NR^6 R^7)]^{3\text{o}}$$

where $R^3$ to $R^7$ independently at each occurrence are H, with H being excluded for $R^5$, straight-chain or branched alkyl having 1-20 C atoms,
straight-chain or branched alkyl having 2-20 C atoms and one or more double bonds,
straight-chain or branched alkyl having 2-20 C atoms and one or more triple bonds,
saturated, partly or wholly unsaturated cycloalkyl having 3-7 C atoms, and being able to be substituted by alkyl groups having 1-6 C atoms,
where one or more of the $R^3$ to $R^7$ may be substituted partly or wholly by halogens, or partly by —OH, —OR', —CN, —C(O)OH, —C(O)NR'$_2$, —SO$_2$NR'$_2$, —SO$_2$OH, —NO$_2$, and where one or more nonadjacent and non-α-located carbon atoms of $R^3$ to $R^7$ may be replaced by atoms and/or atomic moieties selected from the group —O—, —S—, —S(O)—, —SO$_2$—, —C(O)—, —C(O)O—, —N$^+$R'$_2$—, —P(O)R'O—, —C(O)NR'—, —SO$_2$NR'—, —OP(O)R'O—, —P(O) (NR'$_2$)NR'—, —PR'$_2$=N— or —P(O)R'—, with R' being H, unfluorinated, partly fluorinated, or perfluorinated $C_1$ to $C_6$ alkyl, $C_3$ to $C_7$ cycloalkyl, unsubstituted or substituted phenyl.

Thiouronium cations which may be selected are cations corresponding to the general formula (4)

$$[(R^3R^4N)—C(=SR^5)(NR^6R^7)]^+$$

where $R^3$ to $R^7$ independently at each occurrence are H, with H being excluded for $R^5$, straight-chain or branched alkyl having 1-20 C atoms,
straight-chain or branched alkyl having 2-20 C atoms and one or more double bonds,
straight-chain or branched alkyl having 2-20 C atoms and one or more triple bonds,
saturated, partly or wholly unsaturated cycloalkyl having 3-7 C atoms, and being able to be substituted by alkyl groups having 1-6 C atoms,
where one or more of the $R^3$ to $R^7$ may be substituted partly or wholly by halogens, or partly by —OH, —OR', —CN, —C(O)OH, —C(O)NR'$_2$, —SO$_2$NR'$_2$, —SO$_2$OH, —NO$_2$, and where one or more nonadjacent and non-α-located carbon atoms of $R^3$ to $R^7$ may be replaced by atoms and/or atomic moieties selected from the group —O—, —S—, —S(O)—, —SO$_2$—, —C(O)—, —C(O)O—, —N$^+$R'$_2$—, —P(O)R'O—, —C(O)NR'—, —SO$_2$NR'—, —OP(O)R'O—, —P(O) (NR'$_2$)NR'—, —PR'$_2$=N— or —P(O)R'—, with R' being H, unfluorinated, partly fluorinated, or perfluorinated $C_1$ to $C_6$ alkyl, $C_3$ to $C_7$ cycloalkyl, unsubstituted or substituted phenyl.

Guanidinium cations which may be selected are cations corresponding to the general formula (5)

$$[C(NR^8R^9)(NR^{10}R^{11})(NR^{12}R^{13})]^+$$

where $R^8$ to $R^{13}$ independently at each occurrence are H, —CN, —NR'$_2$, —OR', straight-chain or branched alkyl having 1-20 C atoms,
straight-chain or branched alkyl having 2-20 C atoms and one or more double bonds,
straight-chain or branched alkyl having 2-20 C atoms and one or more triple bonds,
saturated, partly or wholly unsaturated cycloalkyl having 3-7 C atoms, and being able to be substituted by alkyl groups having 1-6 C atoms,
where one or more of the $R^8$ to $R^{13}$ may be substituted partly or wholly by halogens, or partly by —OH, —OR', —CN, —C(O)OH, —C(O)NR'$_2$, —SO$_2$NR'$_2$, —SO$_2$OH, —NO$_2$, and where one or more nonadjacent and non-α-located carbon atoms of $R^8$ to $R^{13}$ may be replaced by atoms and/or atomic moieties selected from the group —O—, —S—, —S(O)—, —SO$_2$—, —C(O)—, —C(O)O—, —N$^+$R'$_2$—, —P(O)R'O—, —C(O)NR'—, —SO$_2$NR'—, —OP(O)R'O—, —P(O) (NR'$_2$)NR'—, —PR'$_2$=N— or —P(O)R'—, with R' being able to be H, unfluorinated, partly fluorinated, or perfluorinated $C_1$ to $C_6$ alkyl, $C_3$ to $C_7$ cycloalkyl, unsubstituted or substituted phenyl.

Heterocylic cations which may be selected are cations corresponding to the general formula (6)

$$[HetN]^+$$

where $[HetN]^+$ is selected from the group containing imidazolium, 1H-pyrazolium, 3H-pyrazolium, 4H-pyrazolium, 1-pyrazolinium, 2-pyrazolinium, 3-pyrazolinium, 2,3-dihydroimidazolinium, 4,5-dihydroimidazolinium, 2,5-dihydroimidazolinium, pyrrolidinium, 1,2,4-triazolium, 1,2,3-triazolium, pyridinium, pyridazinium, pyrimidinium, piperidinium, morpholinium, pyrazinimium, thiazolium, oxazolium, indolium, quinolinium, isoquinolinium, quinoxalinium, and indolinium. The cations may have different or identical substituents corresponding to the substitutions indicated above for $R^8$.

$[HetN]^+$ are preferably compounds of the general formula (7)

Imidazolium        Pyridinium where the substituents $R_1'$ to $R_3'$ in each case independently are H, —CN, —NR'$_2$, —OR', P(O)R'$_2$, —P(O) (OR')$_2$, —P(O)NR'$_2$, —C(O)R', —C(O)OR', straight-chain or branched alkyl having 1-20 C atoms,
straight-chain or branched alkyl having 2-20 C atoms and one or more double bonds,
straight-chain or branched alkyl having 2-20 C atoms and one or more triple bonds,
saturated, partly or wholly unsaturated cycloalkyl having 3-7 C atoms, and being able to be substituted by alkyl groups having 1-6 C atoms,
saturated, partly or wholly heteroaryl, heteroaryl-$C_1$-$C_6$ alkyl or aryl-$C_1$-$C_6$ alkyl,
it also being possible for the substituents $R_1'$, $R_2'$ and/or $R_3'$ together to form a ring system,
where one or more of the substituents $R_1'$ to $R_3'$ may be substituted partly or wholly by halogens, or partly by —OH, —OR', —CN, —C(O)OH, —C(O)NR'$_2$, —SO$_2$NR'$_2$, —SO$_2$OH, —NO$_2$, and where one or more nonadjacent and non-heteroatom-bonded carbon atoms of the substituents $R_1'$ to $R_3'$ may be replaced by atoms and/or atomic moieties selected from the group —O—, —S—, —S(O)—, —SO$_2$—, —C(O)—, —C(O)O—, —N$^+$R'$_2$—, —P(O)R'O—, —C(O)NR'—, —SO$_2$NR'—, —OP(O)R'O—, —P(O) (NR'$_2$)NR'—, —PR'$_2$=N— or —P(O)R'—, with R' being able to be H, unfluorinated, partly fluorinated, or perfluorinated $C_1$ to $C_6$ alkyl, $C_3$ to $C_7$ cycloalkyl, unsubstituted or substituted phenyl.

For the purposes of the present invention, wholly unsaturated substituents also include aromatic substituents.

Substituents R and $R^2$ to $R^{13}$ of the compounds of the formulae (1) to (5) are, besides hydrogen, preferably $C_1$ to $C_{20}$, more particularly $C_1$ to $C_{14}$, alkyl groups, and saturated or unsaturated, i.e., including aromatic, $C_3$ to $C_7$ cycloalkyl groups, which may be substituted by $c_1$ to $C_6$ alkyl groups; more particularly phenyl.

The substituents R and $R^2$ are preferably methyl, ethyl, n-propyl, isopropyl, n-butyl, sec-butyl, tert-butyl, pentyl, hexyl, octyl, decyl or tetradecyl.

The substituents $R^3$ to $R^{13}$, independently at each occurrence, are preferably a straight-chain or branched alkyl group having 1 to 10 C atoms. The substituents $R^3$ and $R^4$, $R^6$ and $R^7$, $R^8$ and $R^9$, $R^{10}$ and $R^{11}$, and $R^{12}$ and $R^{13}$ in the compounds of the formulae (3) to (5) may be identical and different. With particular preference $R^3$ to $R^{13}$ independently at each occurrence are methyl, ethyl, n-propyl, isopropyl, n-butyl, sec-butyl, tert-butyl, pentyl, hexyl, octyl, phenyl, cyclohexyl or benzyl.

Substituents $R_1'$ to $R_3'$ of compounds of the formula (7) are, besides hydrogen, preferably $C_1$ to $C_{20}$, more particularly $C_1$ to $C_{12}$, alkyl groups, and saturated or unsaturated, i.e., including aromatic, $C_3$ to $C_7$ cycloalkyl groups, which may be substituted by $C_1$ to $C_6$ alkyl groups; more particularly phenyl.

The substituents $R_1'$ to $R_3'$ are independently at each occurrence preferably methyl, ethyl, n-propyl, isopropyl, n-butyl, sec-butyl, tert-butyl, pentyl, hexyl, octyl, phenyl, cyclohexyl or benzyl, more preferably methyl, ethyl, n-propyl, n-butyl, sec-butyl, tert-butyl or hexyl.

The substituents $R_2'$ and $R_3'$ are independently at each occurrence more preferably hydrogen, methyl, ethyl, n-propyl, isopropyl, n-butyl, sec-butyl, tert-butyl, pentyl, hexyl, cyclohexyl or benzyl.

Examples of imidazolonium ions are 1-n-hexyl-3-methylimidazolium [HMIM], 1-methyl-3-n-octylimidazolium [OMIM], 1-n-butyl-3-methylimidazolium [BMIM], 1-n-octyl-3-methylimidazolium, 1-vinyl-3-methylimidazolium [BVIM], 1-ethyl-3-methylimidazolium, 1-(2-hydroxyethyl)-3-methylimidazolium.

Examples of pymidinium ions are N-butylpyridinium and N-octylpyridinium.

For further cations of the invention, reference may be made to German patent application DE 10 2005 025 315 A1, hereby explicitly referenced.

The anions ($A^-$) are preferably selected from the group of halides, acetates, phosphates, phosphinates, aluminates, borates, sulfates, sulfonates, imides, amides or cyanates.

In the case of the halides, preference is given to chlorides, bromides, iodides, and polyhalides, such as $I_3^-$ or $Br_3^-$.

In the case of the phosphates, preference is given to fluorinated phosphates, such as hexafluorophosphates or tris(pentafluoroethyl)trifluorophosphate, or singly or doubly alkylated and/or benzylated phosphates, optionally wholly or partly substituted, more particularly wholly or partly fluorinated.

In the case of the borates, preference is given to tetrahalide borates, such as $[BF_4]^-$, for example, or to anionic boron complexes with 1,2-dicarbonyl compounds, such as, for example, bisoxalato($2^-$)-borates.

In the case of the sulfates, preference is given to hydrogen sulfates or singly alkylated or benzylated sulfates, optionally wholly or partly substituted, more particularly wholly or partly fluorinated. Examples thereof are methyl sulfate and ethyl sulfate.

In the case of the sulfonates, preference is given to triflates and tosylates and derivates thereof, such as, for example, trifluoromethanesulfonates, para-toluenesulfonates or mesitylsulfonates.

In the case of the imides, preference is given to imides of sulfonates, such as, for example, bis(trifluoromethanesulfonyl)imide.

In the case of the amides, preference is given to dicyanamide.

In the case of the cyanates, preference is given to cyanate, isocyanate or thiocyanate.

Particularly preferred ionic liquids having the general formula $[K^+A^-]$ are 1-n-butyl-3-methylimidazolium chloride ([BMIM]Cl), 1-n-hexyl-3-methylimidazolium chloride ([HMIM]Cl), 1-methyl-3-n-octylimidazolium chloride ([OMIM]Cl), 1-n-butyl-3-methylimidazolium bromide ([BMIM]Br), 1-n-hexyl-3-methylimidazolium bromide ([HMIM]Br), 1-methyl-3-n-octylimidazolium bromide ([OMIM]Br), 1-n-butyl-3-methylimidazolium-tetrafluoroborate ([BMIM] [$BF_4$]), 1-n-hexyl-3-methyl-imidazoliumtetrafluoroborate ([HMIM] [$BF_4$]), 1-methyl-3-n-octylimidazoliumtetrafluoroborate ([OMIM] [$BF_4$]), 1-n-butyl-3-methylimidazoliumhexafluorophosphate ([BMIM] [$PF_6$]), 1-n-hexyl-3-methylimidazoliumhexafluoro-phosphate ([HMIM] [$PF_6$]) or 1-methyl-3-n-octylimidazoliumhexafluorophosphate, ([OMIM] [$PF_6$]), 1-n-butyl-3-methylimidazolium bis(trifluoromethane-sulfonyl)imide ([BMIM] [$NTf_2$]), 1-n-hexyl-3-methylimidazolium bis(trifluoromethanesulfonyl)imide ([HMIM] [$NTf_2$]) or 1-methyl-3-n-octylimidazolium bis(trifluoromethanesulfonyl)imide ([OMIM] [$NTf_2$]), 1-n-butyl-3-methylimidazolium methylsulfonate ([BMIM] [$SO_3Me$]), 1-n-hexyl-3-methylimidazolium methylsulfonate ([HMIM] [$SO_3Me$]) or 1-methyl-3-n-octylimidazolium methylsulfonate ([OMIM] [$SO_3Me$]), 1-n-butyl-3-methylimidazolium methylsulfate ([BMIM] [$SO_4Me$]), 1-n-hexyl-3-methylimidazolium methylsulfate ([HMIM] [$SO_4Me$]) or 1-methyl-3-n-octylimidazolium methylsulfate ([OMIM] [$SO_4Me$]), 1-n-butyl-3-methylimidazolium triflate ([BMIM] [OTf]), 1-n-hexyl-3-methylimidazolium triflate ([HMIM] [OTf]) or 1-methyl-3-n-octylimidazolium triflate ([OMIM] [OTf]). Many ionic liquids are available commercially, as for example from Merck (Darmstadt, DE), Sigma-Aldrich (St. Louis, US), Solvent Innovation (Cologne, DE) or Ionic Liquids Technologies GmbH (Denzlingen, DE).

In the case of titanium compounds as hydrolyzable metal compounds, preference is given to ionic liquids with imidazolonium ions, preferably 1-n-butyl-3-methylimidazolium chloride [BMIM], with the anions selected from the group of halides, acetates, phosphinates, aluminates, sulfates, sulfonates, imides, amides or cyanates, more preferably chloride, bromide, $NTf_2$, $SO_3Me$, $SO_4Me$, and OTf.

Ionic liquids which are particularly preferred in the case of titanium compounds are preferably 1-n-butyl-3-methylimidazolium chloride ([BMIM]Cl), 1-n-butyl-3-methylimidazolium bromide ([BMIM]Br), 1-n-butyl-3-methylimidazolium bis(trifluoromethanesulfonyl)imide ([BMIM] [$NTf_2$]), 1-n-butyl-3-methylimidazolium methylsulfonate ([BMIM] [$SO_3Me$]), 1-n-butyl-3-methylimidazolium methylsulfate ([BMIM] [$SO_4Me$]), 1-n-butyl-3-methylimidazolium triflate ([BMIM] [OTf]).

With advantage, the ratio, measured in mmol, of hydrolyzable metal compound to ionic liquid is between 10:1 and 1:10, preferably between 5:1 and 1:5. With advantage, more ionic liquid is used. The ratio then is between 1:1 and 10:1, preferably between 1:1 and 5:1, more preferably between 1.5:1 and 5:1, and between 1.5:1 and 3:1, more preferably 2:1.

The composition further comprises at least one compound having at least one hydroxyl group. With advantage, this compound is the solvent for the hydrolyzable compound and for the ionic liquid. It is preferably a compound having a boiling point of below 200° C. (under atmospheric pressure). Preferred compounds are those which can also be used as alkoxy ligands for the hydrolyzable metal compound. Such compounds are, for example, lower aliphatic alcohols ($C_1$-$C_6$ alcohols), such as ethanol, 1-propanol, isopropanol, sec-butanol, tert-butanol, isobutyl alcohol, n-butanol, and the pentanol isomers, more particularly 1-pentanol. Preference here is given to methanol, ethanol, propanol, isopropanol, and n-butanol.

The at least one compound having a hydroxyl group may contain traces of water, which are important for the condensation of the hydrolyzable metal compound. With advantage, the water content is below 10%, preferably below 5%, more preferably below 2%. In another embodiment, the amount may be between below 0.1% and 10% (measured in % by weight by Karl-Fischer method). Through the amount of water it is possible to influence the size of the resultant particles. Preference is given to an amount between below 0.1% and 2%. In one preferred embodiment the amount is 2%.

With advantage, the water content of the hydrolyzable compound is the only input of water into the composition. The ionic liquid is used dried in accordance with the prior art.

As a preferred sequence of addition, the hydrolyzable metal compound is added to a mixture of the ionic liquid and the compound having at least one hydroxyl group. With advantage, this compound is present in a marked excess in relation to the hydrolyzable metal compound. Measured in mmol, the ratio is preferably between 10:1 and 100:1, preferably between 20:1 and 60:1.

In contrast to the prior art, the composition contains no catalyst for the hydrolysis of the metal compound, such as acid or base, for example. Without being tied to any particular theory, it is assumed that the ionic liquid promotes the formation of certain precursor compounds, which react under hydrothermal conditions to give the nanoscale particles.

The resultant mixture is then treated at a temperature of at least 60° C. to form a dispersion or a precipitate of nanoscale particles. This heat treatment takes place hydrothermally.

The heat treatment takes place preferably over a period of 0.5 to 30 hours, more preferably 5 to 24 hours, the duration being dependent on the temperature and on any pressure applied. In the case of Ti compounds, for example, anatase is obtained by hydrothermal treatment at 200° C. under autogenous pressure after a reaction time of 12 hours, in nanoparticulate crystalline form.

A hydrothermal treatment means, in general, the heat treatment of an aqueous solution or suspension under superatmospheric pressure, as for example at a temperature above the boiling point of the solvent and at a pressure above 1 bar.

In the present invention, hydrothermal treatment is also understood to include heat treatment in a predominantly organic solvent, which contains only little water if any, under superatmospheric pressure.

For the hydrothermal treatment, the mixture is heat-treated in a closed vessel or a closed autoclave. The treatment takes place preferably at a temperature in the range from 75° C. to 300° C., preferably above 200° C., more preferably 225 to 275° C., e.g., about 250° C. As a result of the heating, more particularly above the boiling point of the solvent, a pressure (autogenous pressure) is built up within the closed container or autoclave.

The pressure obtained may amount, for example, to more than 1 bar, more particularly 50 to 500 bar or more, preferably 100 to 300 bar, e.g., 200 bar. Generally speaking, the hydrothermal treatment takes place for at least 0.5 hours, and preferably up to 10 or 15 hours.

The heat treatment in accordance with step b) is continued until the desired particles are formed.

The crystalline fraction of the doped particles obtained preferably accounts for more than 90%, more preferably more than 95%, and more particularly more than 97%; in other words, the amorphous fraction is more particularly below 3%, e.g., at 2%. The average particle size (volume average determined roentgenographically) is preferably not more than 20 nm, more preferably not more than 15 nm. In one particularly preferred embodiment, particles having an average particle size of about 2 to 10 nm are obtained.

The particles are separated from the solvent and from the ionic liquid. For this purpose it is possible to use all of the methods that are known to the skilled person. A centrifugation is particularly suitable. If desired, volatile constituents, such as, for example, the compound having at least one hydroxyl group, may be distilled off beforehand under subatmospheric pressure, as for example in a rotary evaporator at 40 mbar.

In this way, the ionic liquid can be regenerated and can even be used repeatedly.

The particles separated off are then dried (e.g., at 40 C and 10 mbar). In this form, the particles can also be stored effectively. The particles can also be freeze-dried from an aqueous suspension.

In a development of the invention a treatment under reflux is carried out prior to step b). This treatment takes place for between 1 and 10 hours. It involves the formation of a precursor compound, which can be isolated. From this compound it is possible, by hydrothermal treatment, to obtain nanoscale particles. Prior to the treatment with reflux it may be necessary to stir the composition for 1 to 3 hours.

The invention concerns a method for preparing a precursor compound for the hydrothermal production of nanoscale particles. This compound can be obtained if the composition from step a) is treated under reflux, in accordance with the pretreatment, as described above. Thereafter the volatile constituents are removed by distillation. Removed by distillation here means, preferably, removal on a rotary evaporator at not more than 60° C. under a minimum pressure of 20 mbar. The precursor compound can be isolated from this residue.

In one preferred embodiment, for this purpose, the residue is dissolved under reflux in an aprotic solvent. The precursor compound can be isolated from the resulting solution preferably by crystallization.

The aprotic solvents are preferably polar solvents. Examples of such solvents are ethyl acetate, acetonitrile, tetrahydrofuran, acetone, nitromethane, dimethylformamide, dimethyl sulfoxide. It is also possible to use mixtures. Preferred mixtures are of ethyl acetate, acetone, tetrahydrofuran or acetone.

As this solution cools, a precipitate of the precursor compound is formed.

The invention further concerns a method for producing nanoscale particles by mixing the precursor compound, prepared as described above, with at least one compound having at least one hydroxyl group, and carrying out hydrothermal treatment. The ratio between precursor compound and the compound, measured in mmol, is between 10:1 and 1000:1, preferably between 200:1 and 600:1.

The mixture is treated hydrothermally as described above. The conditions which apply here are the same as those for the composition with the hydrolyzable metal compound.

A particular advantage for the production of the particles from the precursor compound is that there is no need to add an ionic liquid or a catalyst in order to obtain crystalline nanoparticles after the hydrothermal treatment.

The composition with the precursor compound for producing the nanoscale particles or the composition with the hydrolyzable metal compound may also comprise further compounds for producing doped particles. For doping it is possible to use any suitable metal compound, e.g., an oxide, a salt or a complex compound, e.g., halides, nitrates, sulfates, carboxylates (e.g., acetates) or acetylacetonates. The compound ought to be expediently soluble in the solvent used for the mixture.

A suitable metal is any metal, more particularly a metal selected from groups 5 to 14 of the Periodic Table of the Elements, and the lanthanoids and actinides. In the compound, the metal may be in any suitable oxidation pre-state. Examples of suitable metals for the metal compound are W, Mo, Cr, Zn, Cu, Ag, Au, Sn, In, Fe, Co, Ni, Mn, Ru, V, Nb, Ir, Rh, Os, Pd, and Pt. Metal compounds of W (VI), Mo (VI), Cr (lit), Zn (II), Cu (II), Au (III), Sn (IV), In(III), Fe (III), Co (II), V (V), and Pt (IV) are used with preference. Very good results are achieved more particularly with W (VI), Mo (VI), Zn (II), Cu (II), Sn (IV), In(III), and Fe (III). Specific examples of preferred metal compounds are $WO_3$, $MoO_3$, $FeCl_3$, silver acetate, zinc chloride, copper (II) chloride, indium (III) oxide, and tin (IV) acetate.

The proportion between the metal compound and the hydrolyzable metal compound is also dependent on the metal used and on its oxidation state. Generally speaking, for example, the proportions used are those which result in a molar ratio of metal of the metal compound (Me') to the metal of the hydrolyzable metal compound (Me), (Me'/Me), of 0.0005:1 to 0.2:1, preferably 0.001:1 to 0.1:1, and more preferably 0.005:1 to 0.1:1.

Instead of the metal doping it is also possible to carry out doping with semi-metal or nonmetal elements, as for example with carbon, nitrogen, phosphorus, sulfur, boron, arsenic, antimony, selenium, tellurium, chlorine, bromine and/or iodine.

For this purpose, either the elements as such, or suitable element compounds, are used as dopants. Doping is advantageous especially when titanium compounds are being used, in order to influence the photocatalytic properties.

Further details and features will emerge from the description below of preferred working examples in conjunction with the dependent claims. In these examples, the respective features may be actualized on their own or plurally in combination with one another. The possibilities for achieving the object are not confined to the working examples. Thus, for example, range indications always encompass all—unstated—in-between values and all conceivable sub-intervals.

The tables show the various experiments. For all of the experiments, 10 mmol of $Ti(O^iPr)_4$ (2.84 g) (distilled under reduced pressure) was used. [BMIM] [Cl], [BMIM] [Br], [BMIM] [$PF_6$], [BMIM] [$BF_4$], [BMIM] [$NTf_2$] were prepared in accordance with Creary, X; Wilis, E. D. *Organic Syntheses* 2005, 82, 166. [BMIM] [$SO_3Me$], [BMIM] [$SO_4Me$] and [BMIM] [OTf] were obtained from IoLiTec GmbH and used as received.

The powder diffractometry measurements (XRD measurements; X-ray diffraction) were carried out using a Bruker AXS D8 with Cu Kα radiation (λ=0.154 nm) at 40 kV and 40 mA. A position-sensitive detector (LynsEye) with Bruker AXS "Compound silicon strip" technology. The measurements were carried out from 3° to 90° (2θ) with a step width of 0.02°. For all of the powders, glass sample holders were used. Structure determination and profile analysis of the diffraction spectra were performed using the TOPAS program. The line forms were determined by convolution of the emission profile of the X-ray source with the instrument errors and the physical properties of the sample ("fundamental parameters consolation based approach"). The average crystallite sizes were calculated using the Scherrer equation (Scherer constant K=1). The integral width, based on a volume-weighted calculation, was represented, on the assumption of a broadening by the crystallite size, with a Voigt function.

Transmission electron microscopy (TEM) or high-resolution transmission electron microscopy was carried out using a JEM-3010 electron microscope. Porosity measurement (Nitrogen porosimetry) was carried out using a Quantuchrome Autosorb6B instrument. The surface area of the particles was calculated using the Brunauer-Emmett-Teller equation (BET).

BRIEF DESCRIPTION OF THE DRAWINGS

Table 1: Experiments with [BMIM] [Cl] and different amounts of ionic liquid and water;
Table 2: Experiments with different alcohols as compound having at least one hydroxyl group;
Table 3: Experiments with different ionic liquids;
Table 4: Reaction conditions of the various experiments;
Table 5: Experiments with different reactants for the synthesis of the particles.

DETAILED DESCRIPTION OF INVENTION

Experiments S1 to S7

Figure 1:
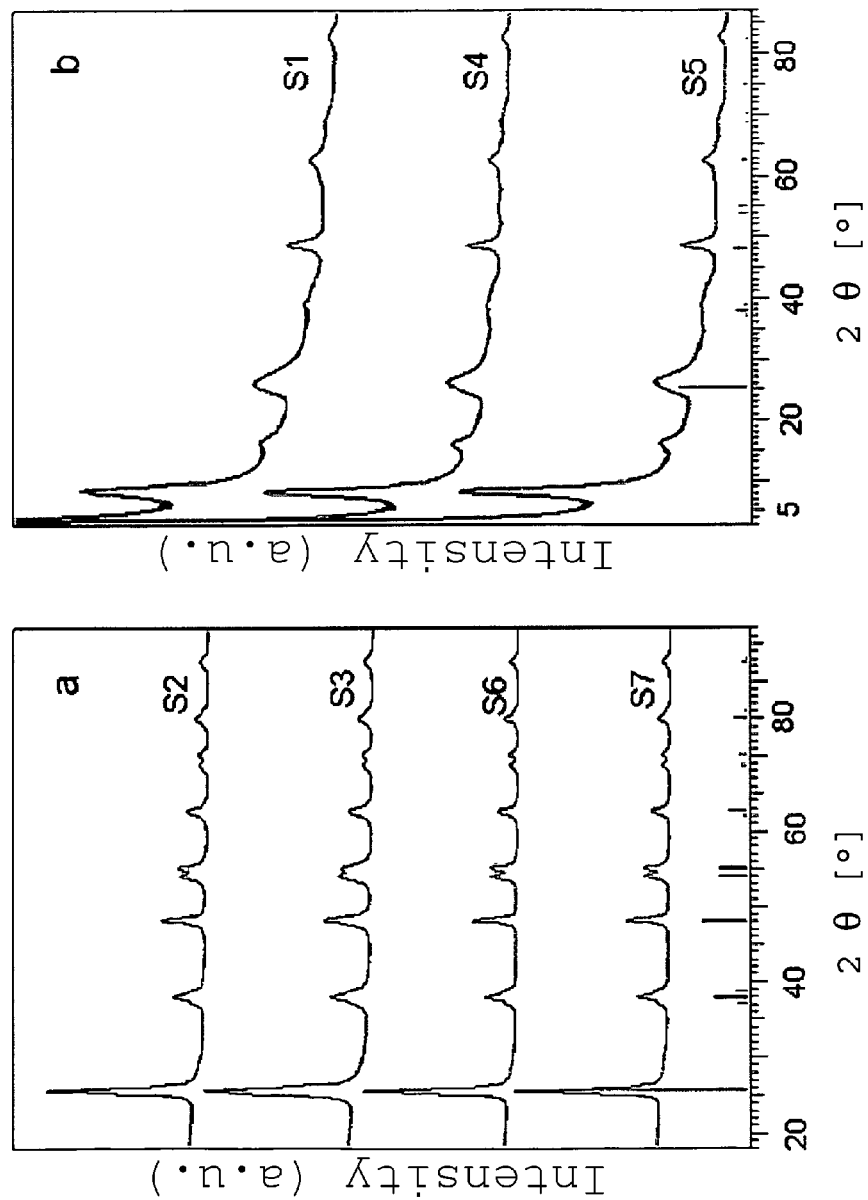
FIG. 1: XRD measurements of samples a) S2, S3, S6, and S7; b) S1 to S7.

Experiments with ethanol as the compound having a hydroxyl group and [BMIM] [Cl] showed that by pretreatment under reflux for 4 hours it was possible to obtain $Ti_4O_7(OEt)_{20}$. FIG. 1 shows XRD measurements of various samples. In the case of hydrothermal treatment for 2.75 hours (S1), there was only partial formation of anatase (FIG. 1b S1). Only by extending the hydrothermal treatment to 12 hours was highly crystalline anatase ($TiO_2$) formed, with a crystallite size of 9 nm (according to Scherer equation: FIG. 1a S2; table 1). The TEM micrographs FIG. 2a) and b) confirm this result. Visible on the TEM micrograph of S2 (FIG. 2a)) are spherical and cubelike particles, in agreement with the ratio of the calculated signals ("crystallite size broadening") of the (004):(020) reflections of 7:8. No signals of other phases were measured.

Figure 2:
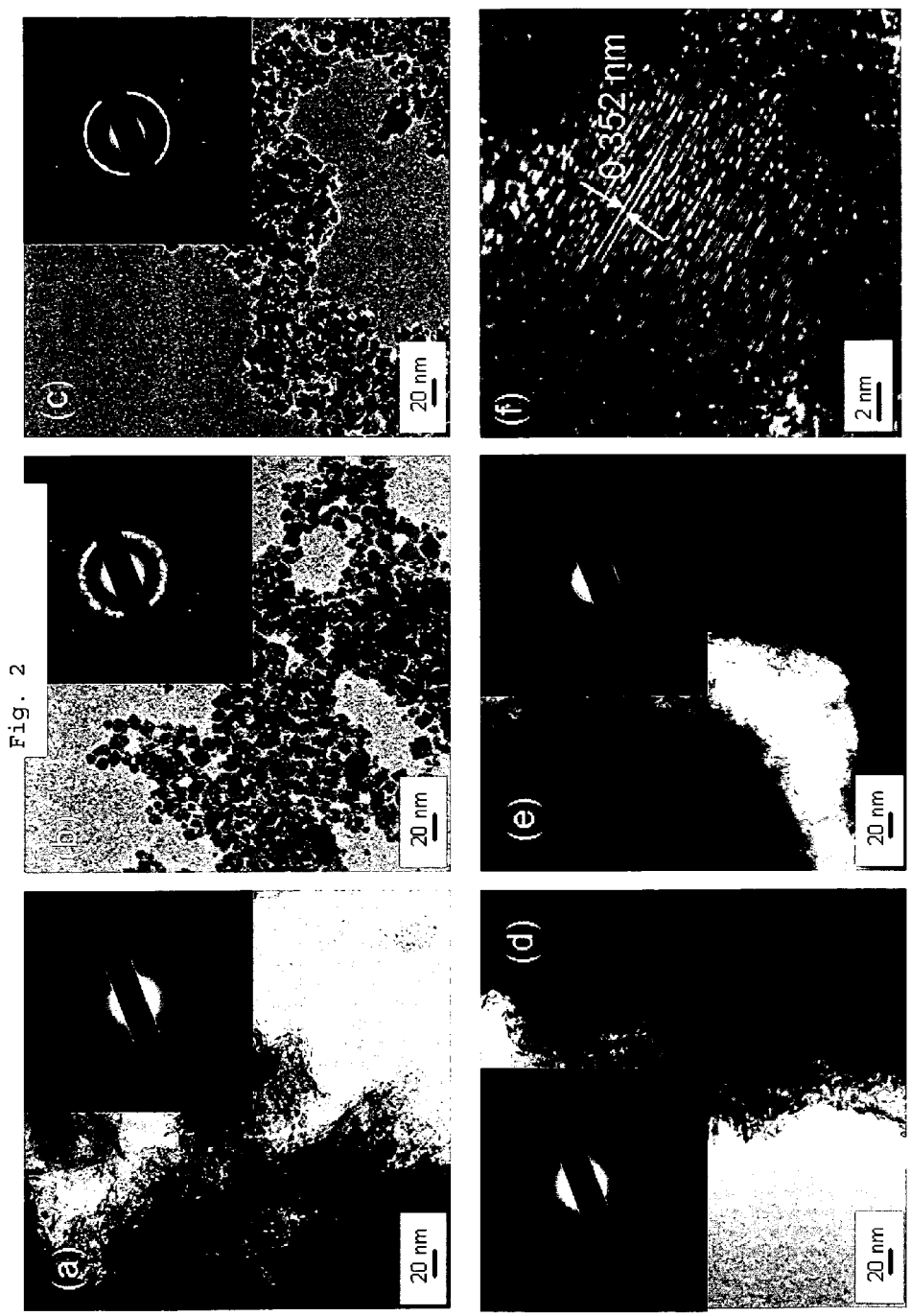
FIG. 2: TEM micrographs of a) S1, b) S2, c) S3, d) S4, e) S5, and f) HRTEM of S3; the insets show selected regions of the electron diffraction patterns.

Without a pretreatment with reflux it was possible to obtain similar results (FIG. 1a S3; FIG. 2c), f)), but with a smaller size of the crystallites, of 6 nm.

A reduction in the amount of [BMIM] [Cl] to (S4 (0.5 eq) and S5 (1 eq) resulted in porous and only partially crystalline products. In the XRD measurements, signals at a low 2θ value are clearly apparent (FIG. 1b and FIG. 2d), e)).

Figure 3:
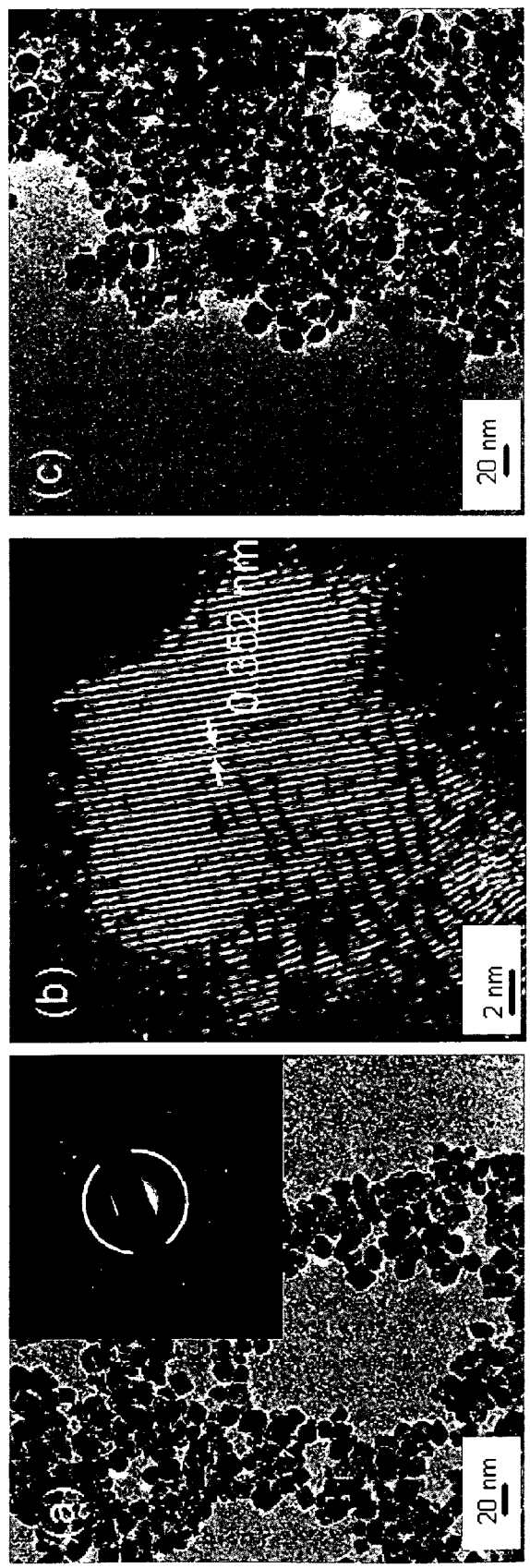
FIG. 3: TEM micrographs of a) S6; b) HRTEM of S6; c) S7; the inset shows a selected region of the electron diffraction pattern.

Another important point is the water content of the composition. Accordingly, for samples S6 and S7, the water content of the ethanol was increased to 2% and 5%, respectively. It was found (see TEM micrographs FIG. 3) that with an increased water content, somewhat larger cubelike particles were obtained (S6 10 nm; S7 11 nm) than for S2 and S3. The calculated crystallite side ratio of the (004):(020) lattice planes is almost 8:8 for S6 and 9:10 for S7. In the HRTEM micrograph of S6 (FIG. 3b), the particles parallel to the (101) plane are seen.

The surface area of the particles was calculated by the BET method ($S_{BET}$). The measured surface area of the particles (table 1) was between 120 and 163 $m^2/g$.

In agreement with the XRD measurements, an increased amount of water leads to a decrease in the surface area of the particles.

Experiments with Other Alcohols

The samples identified in table 2 were carried out. All samples were prepared without pretreatment.

Figure 4:
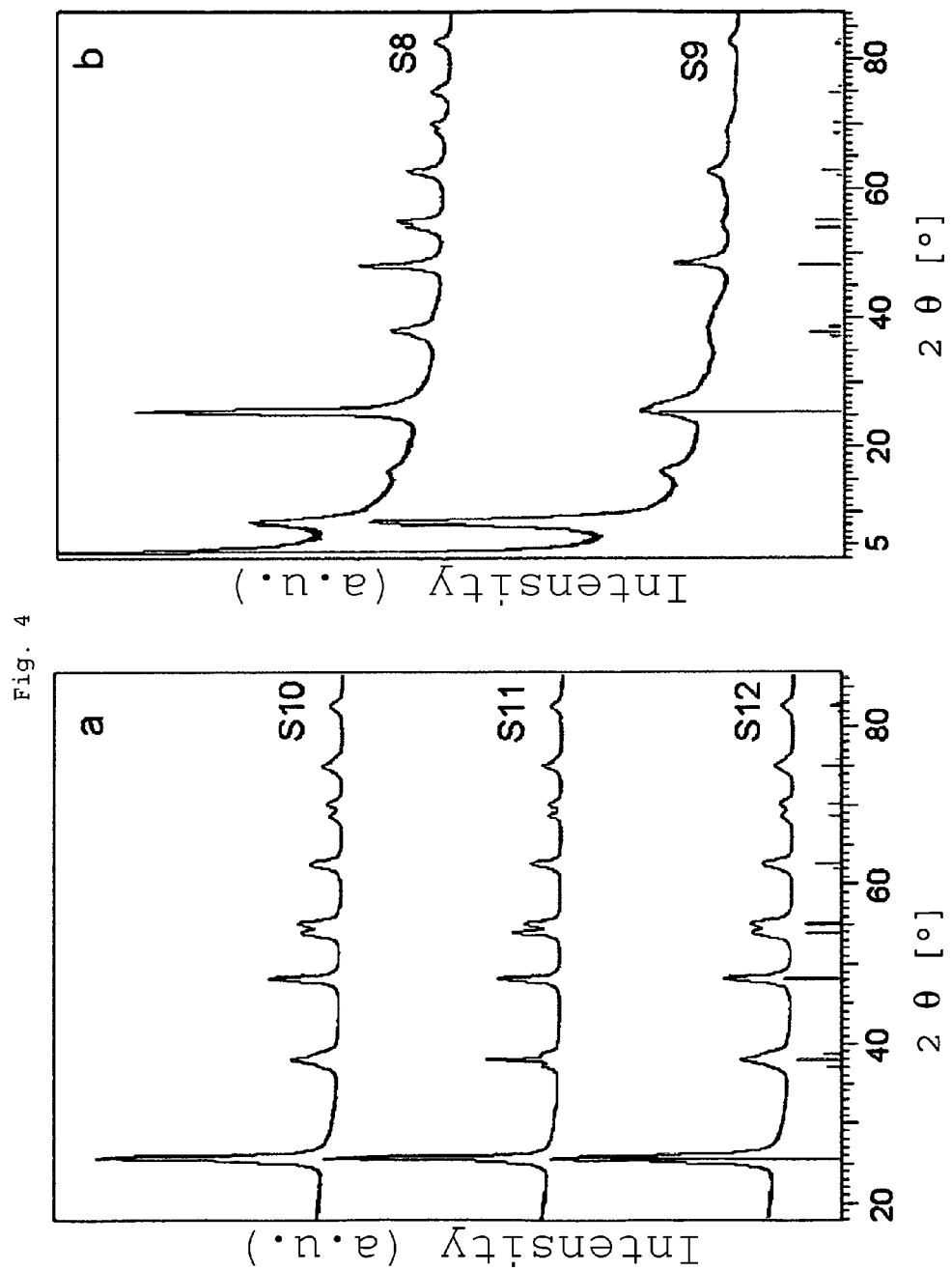
FIG. 4: XRD measurements of a) S10; S11; S12 and b) S8; S9.

From the XRD measurements (FIG. 4b) it is apparent that for PrOH (S8) and $^i$PrOH (S9) with a water content of below 0.1%, in addition to anatase, at least one further phase was formed, with anatase being the principal product for S8.

Figure 5:
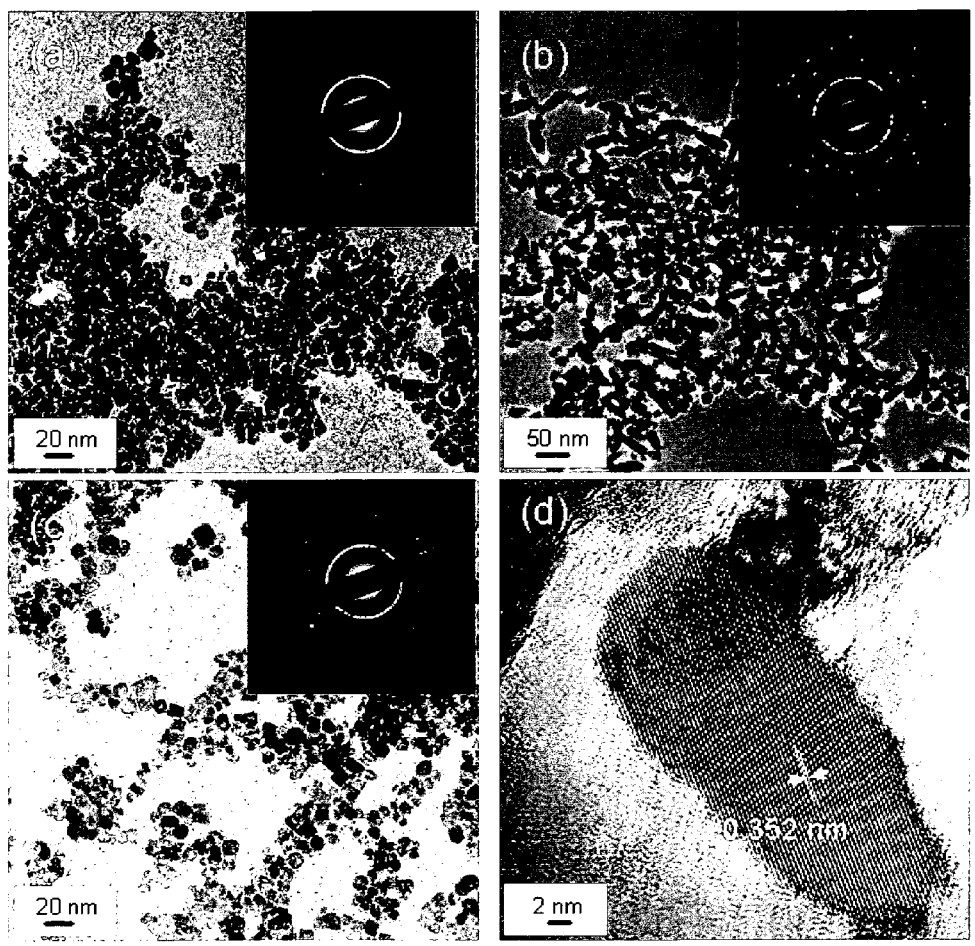
FIG. 5: TEM micrographs of a) S10; b) S11; c) S12; the insets show selected regions of the electron diffraction patterns.
Figure 6:
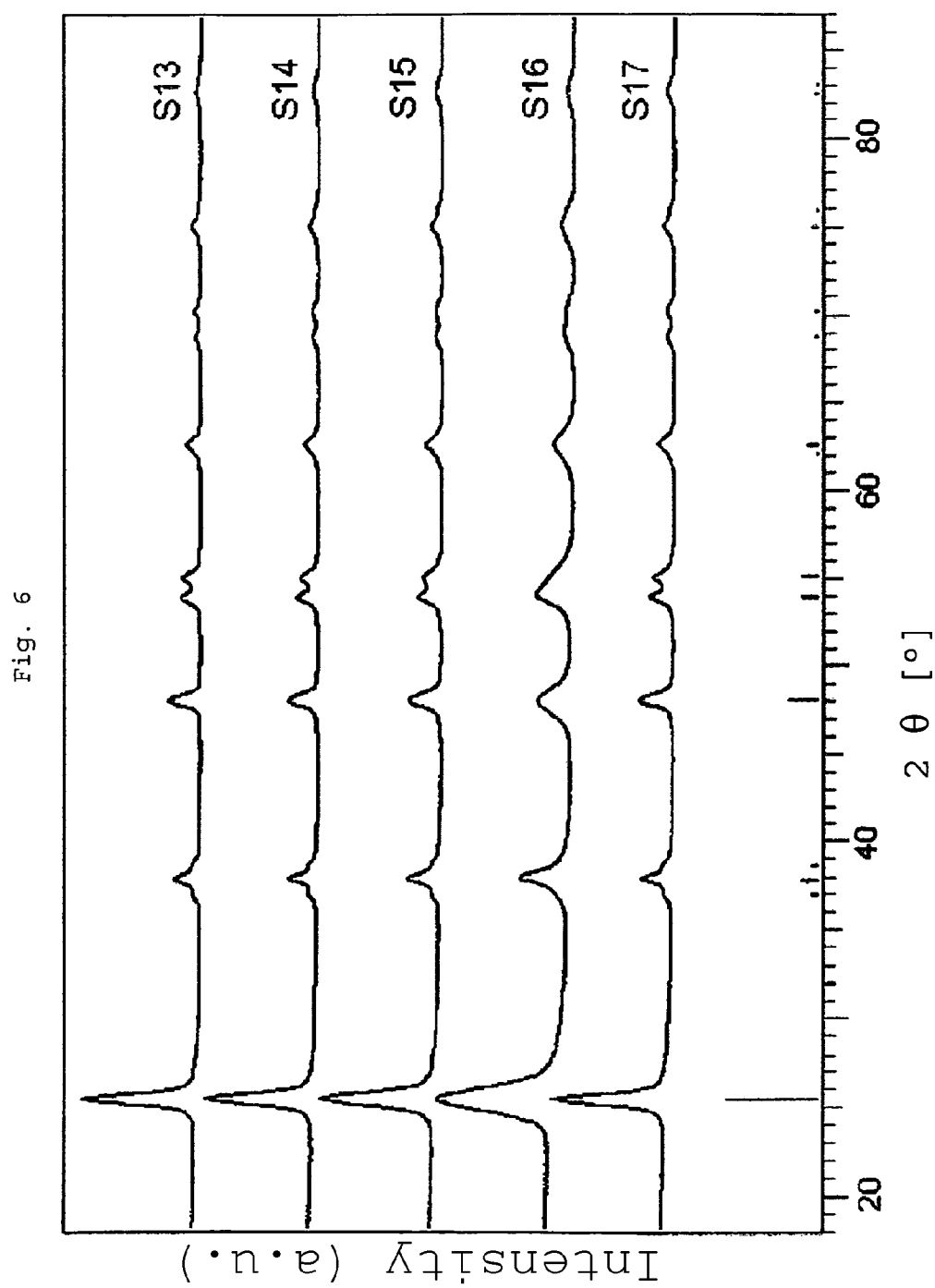
FIG. 6: XRD measurements of samples S13; S14; S15; S16 and S17.

On an increase in the water content to 2%, highly crystalline anatase particles were obtained for PrOH (S10), $^i$PrOH (S11), and BuOH (S12). The average crystallite size lies between 8 and 13 nm (table 2). The investigations of the ratios of the (004):(020) reflections, however, shows that S10 (6:8) and S12 (5:7) are cuboid particles, while in the case of S11 bipyramidal particles have formed (20:8). This is also apparent in the TEM micrographs (FIG. 5b), d)). The HTEM micrograph of FIG. 5d) shows that the particles on the copper lattice stand parallel to their [101] direction.

Experiments with Other Ionic Liquids

For the experiments with other ionic liquids, ethanol with 2% water was always used. This is sufficient for complete condensation of the precursor employed. Table 3 shows the reactants used.

Figure 7:
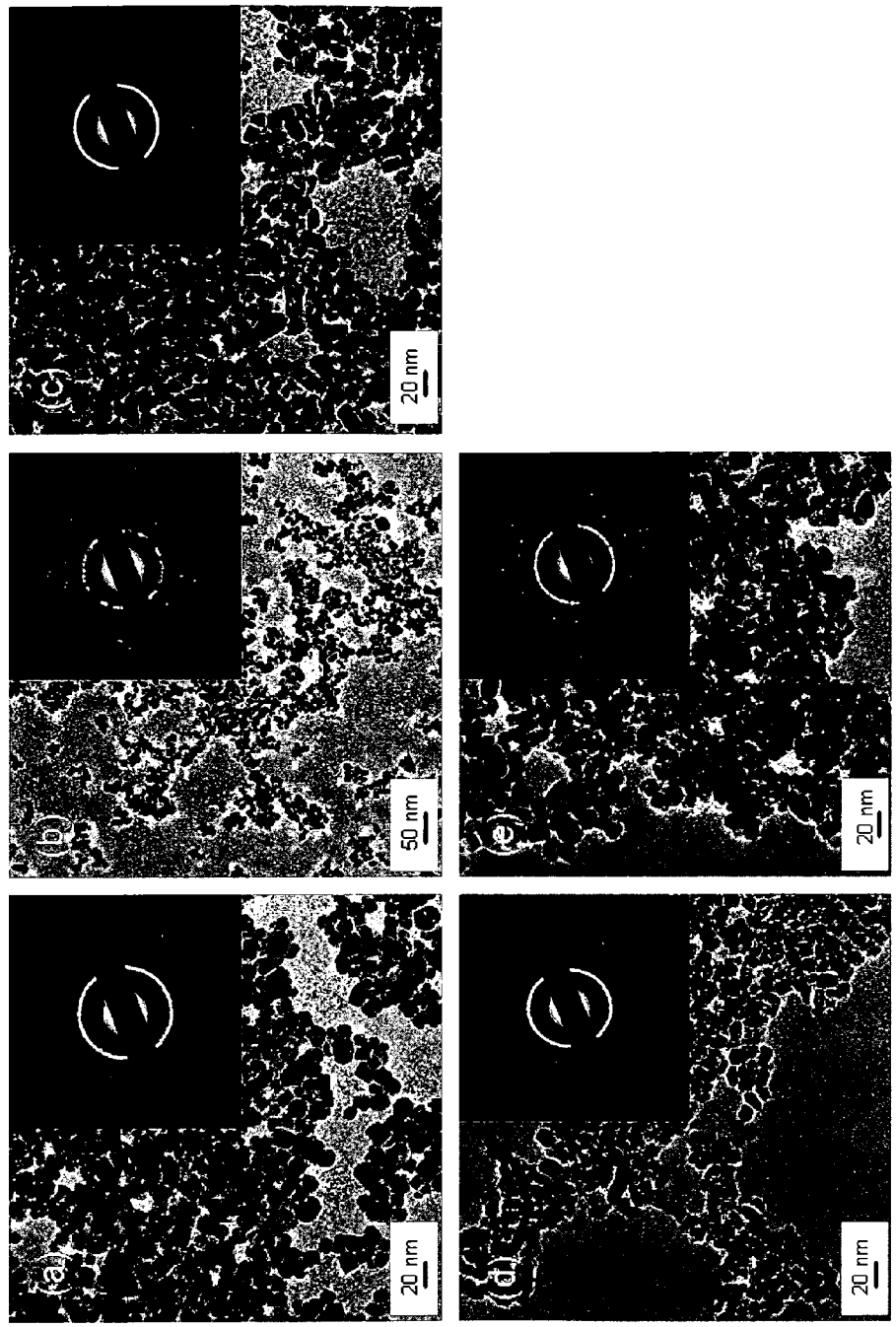
FIG. 7: TEM micrographs of a) S13; b) S14; c) S15; d) S16; e) S17; the insets show selected regions of the electron diffraction patterns.

It was found that with [BMIM] [Br], [BMIM] [NTf$_2$], [BMIM] [SO$_3$Me], [BMIM] [SO$_4$Me] and [BMIM] [OTf], highly crystalline, single-phase anatase particles with a crystallite size of 4 to 11 nm were obtainable. Measurements of the surface area correlate well with these sizes. The TEM micrographs as well (FIG. 7) show the different particle sizes.

Experiments with Ti$_4$O$_7$(OEt)$_{20}$

Figure 8:
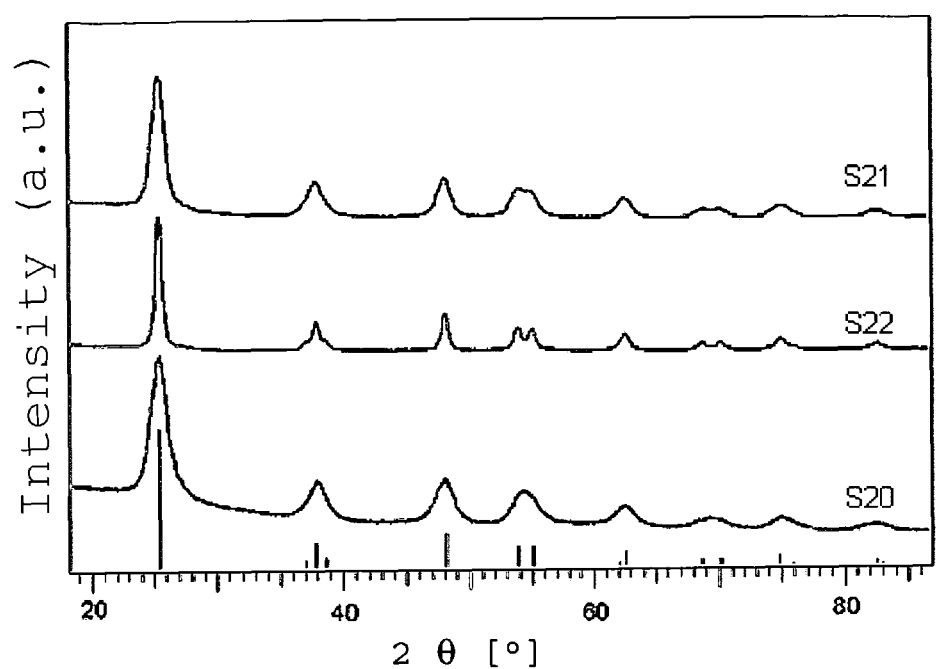
FIG. 8: XRD measurements of samples S20; S12 and S22.
Figure 9:
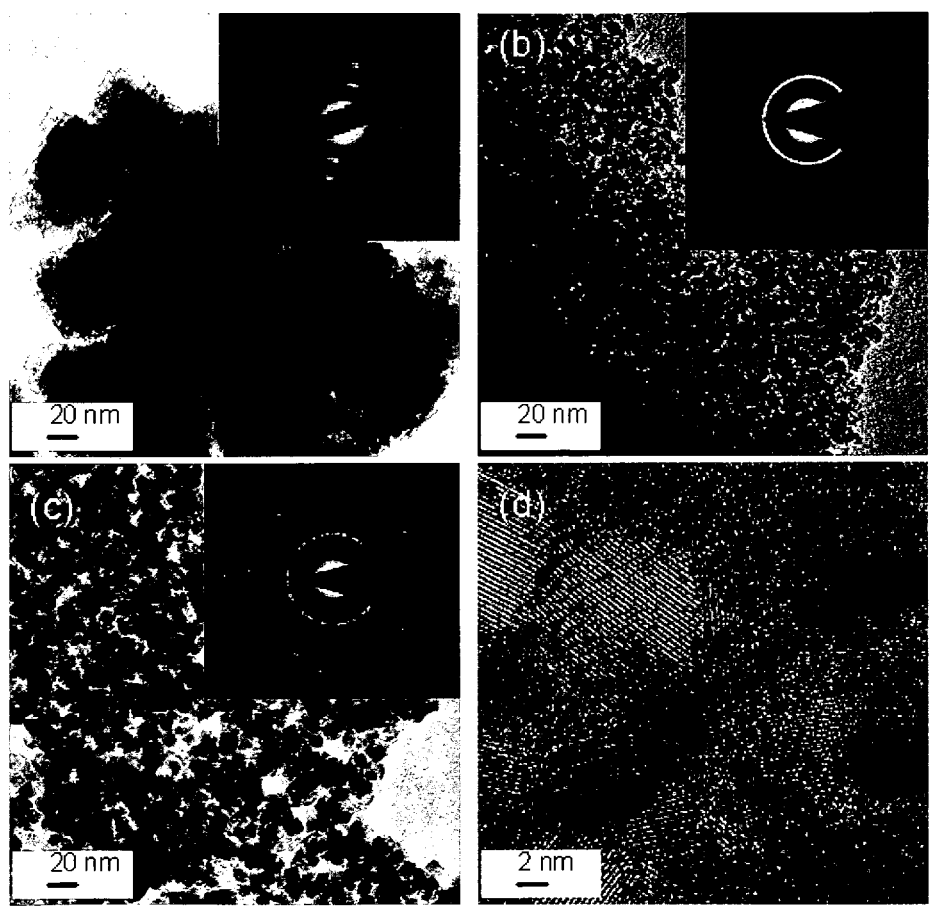
FIG. 9: TEM micrographs of a) S20; b) S21; c) S22; d) HRTEM of S22; the insets show selected regions of the electron diffraction patterns.

An investigation was carried out into whether nanoparticles can also be produced with the aid of the precursor obtained by reflux. For this purpose, the precursor prepared (Ti$_4$O$_7$(OEt)$_{20}$, 1.27 g) was dissolved in ethanol (26 g<0.1% (S21) or 2% water (S22)) and was treated hydrothermally in an autoclave at 210° C. for 12 hours without ionic liquid. The same procedure was carried out with Ti($^i$Pr)$_4$ (S20). Table 5 reports the measured crystallite sizes and measured particle surface areas. XRD measurements (FIG. 8) show that in the case of the control experiment, S20, only particles with a low degree of crystallization are obtained. In contrast, when using the precursor, highly crystalline single-phase crystallites were obtained. Depending on the water content, different sizes were obtained. The powders obtained resemble samples S3 and S6, which were prepared with [BMIM] [Cl] as ionic liquid. This shows that the precursor prepared by controlled hydrolysis in the presence of an ionic liquid makes it possible to obtain highly crystalline particles even without ionic liquid.

Re-Use of the Ionic Liquid

The present process additionally allows simple re-use of the ionic liquid. The particles and the compounds having at least one hydroxyl group that are used can be easily separated by centrifugation and distillation. Accordingly, it was possible to isolate [BMIM] [Cl] and [BMIM] [NTf$_2$] up to five times and use them again with ethanol (2% water). Each time, highly crystalline anatase particles with a crystallite size of between 10 and 11 nm were obtained in a quantitative yield.

Numerous modifications and developments of the working examples described can be realized.

Production of the Particles 2.84 g of Ti(O$^i$Pr)$_4$ (titanium tetraisopropoxide; 10 mmol) were added dropwise to a solution of the ionic liquid (20 mmol) and ethanol (26 g) at room temperature (the water content of the ethanol was varied between 0.1% and 5%). The solution was stirred and then refluxed for 4 hours. During this time, Ti$_4$O$_7$(OEt)$_{20}$ was formed. The reaction mixture was transferred to a Teflon flask and treated hydrothermally in an autoclave. Without the prior refluxing, the reaction mixture directly after the addition was treated hydrothermally in the autoclave. The reaction mixture was heated to 220° C. with a heating rate of 4.4 K/min. The entire hydrothermal treatment was carried out for 2.75 or 12 hours. The sample was cooled to room temperature in the autoclave. The solids formed were removed by centrifuging. The products were washed five times with ethanol and freeze-dried with water as solvent.

Following isolation of the particles and distillative removal of the volatile constituents (ethanol), the ionic liquids used can be re-used.

For other alcohols (as reported in table 2, for example), an analogous procedure was performed. The reaction conditions of the samples are summarized in table 4.

Preparation of Ti$_4$O$_7$(OEt)$_{20}$ 2.84 g of Ti(O$^i$Pr)$_4$ (10 mmol) were added dropwise with stirring to a solution of [BMIM] [Cl] (20 mmol, 3.49 g) in ethanol (11.4 g; <0.1% water) in an open flask. After an hour of stirring at room temperature, a cloudy solution was obtained. The temperature was increased to the reflux temperature, and a clear solution was formed. The sample was stirred further for 4 hours more, and the volatile constituents were removed by distillation.

The solution which remained was dissolved in CH$_3$CN and EtOAc (1:1) under reflux and was filtered through a paper filter. This solution (mother liquor) was stored at room temperature over night. During this time, colorless crystals were formed. The mixture was stored for a further day at −30° C. The liquid phase was decanted and the solids obtained were washed three times with CH$_3$CN and dried in a stream of nitrogen. This gave 1.27 g of Ti$_4$O$_7$(OEt)$_{20}$ (70%).

The Ti$_4$O$_7$(OEt)$_{20}$ obtained was dissolved in ethanol (26 g with 0.1% or 2% water) and treated hydrothermally at 210° C. for 12 hours. This gave crystalline TiO$_2$ particles in the form of anatase (S21, S22).

Figure 10:
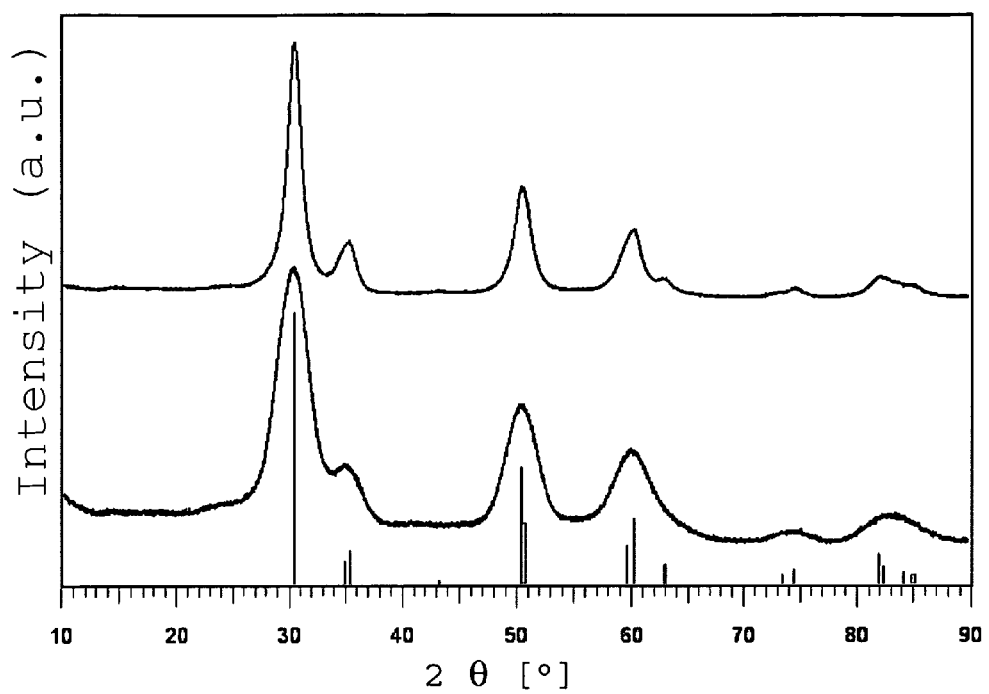
FIG. 10: XRD measurements of $ZrO_2$ particles.

Production of ZrO$_2$ Particles 4.68 g of Zr(O$^i$Pr)$_4$ (zirconium tetraisopropoxide; 10 mmol, 70% in propanol) were added dropwise at room temperature to a solution of [BMIM] [Cl] (20 mmol) and ethanol (26 g) (water content of the ethanol was varied between 0.1% and 5%). The reaction mixture was treated hydrothermally in an autoclave. The reaction mixture was heated to 210° C. with a heating rate of 4.4 K/min. The entire hydrothermal treatment was carried out for 12 hours. The sample was cooled slowly to room temperature in the autoclave. The solids formed were separated off by centrifuging. The products were washed five times with ethanol and dried at room temperature. This gave tetragonal ZrO$_2$ nanoparticles. From the XRD measurements shown in FIG. 10 it is possible to calculate a crystallite size of 2 nm (Scherrer constant k=1). The white particles of solid were sintered at 500° C. for 4 hours. This gave tetragonal ZrO$_2$ nanoparticles having a size of about 5 nm.

LITERATURE CITED

DE 10 2004 009 287 A1

TABLE 1

| Sample | Alcohol | Water content | Ionic liquid | Particle size [nm] | S$_{BET}$ [m$^2$g$^{-1}$] |
|---|---|---|---|---|---|
| S1 | EtOH (26 g) | <0.1% | [BMIM][Cl] 2 eq | — | — |
| S2 | EtOH (26 g) | <0.1% | [BMIM][Cl] 2 eq | 9 | 143 |
| S3 | EtOH (26 g) | <0.1% | [BMIM][Cl] 2 eq | 6 | 163 |
| S4 | EtOH (26 g) | <0.1% | [BMIM][Cl] 0.5 eq | — | — |
| S5 | EtOH (26 g) | <0.1% | [BMIM][Cl] 1 eq | — | — |
| S6 | EtOH (26 g) | 2% | [BMIM][Cl] 2 eq | 10 | 123 |
| S7 | EtOH (26 g) | 5% | [BMIM][Cl] 2 eq | 11 | 120 |

TABLE 2

| Sample | Alcohol | Water content | Ionic liquid | Particle size [nm] | S$_{BET}$ [m$^2$g$^{-1}$] |
|---|---|---|---|---|---|
| S8 | n-PrOH (26 g) | <0.1% | [BMIM][Cl] 2 eq | 8 | — |
| S9 | i-PrOH (26 g) | <0.1% | [BMIM][Cl] 2 eq | — | — |
| S10 | n-PrOH (26 g) | 2% | [BMIM][Cl] 2 eq | 9 | 143 |
| S11 | i-PrOH (26 g) | 2% | [BMIM][Cl] 2 eq | 13 | 102 |
| S12 | BuOH (26 g) | 2% | [BMIM][Cl] 2 eq | 8 | 146 |

TABLE 3

| Sample | Alcohol | Water content | Ionic liquid | Particle size [nm] | S$_{BET}$ [m$^2$g$^{-1}$] |
|---|---|---|---|---|---|
| S13 | EtOH (26 g) | 2% | [BMIM][Br] 2 eq | 11 | 123 |
| S14 | EtOH (26 g) | 2% | [BMIM][NTf$_2$] 2 eq | 10 | 119 |
| S15 | EtOH (26 g) | 2% | [BMIM][SO$_3$Me] 2 eq | 8 | 148 |
| S16 | EtOH (26 g) | 2% | [BMIM][SO$_4$Me] 2 eq | 4 | 179 |
| S17 | EtOH (26 g) | 2% | [BMIM][OTf] 2 eq | 10 | 128 |

Table 4

| Sample | Pretreatment | Hydrothermal treatment |
|---|---|---|
| S1 | 4 h reflux | 2.75 h/210° C. |
| S2 | 4 h reflux | 12 h/210° C. |
| S3 | — | 12 h/210° C. |
| S4 | — | 12 h/210° C. |
| S5 | — | 12 h/210° C. |
| S6 | — | 12 h/210° C. |
| S7 | — | 12 h/210° C. |
| S8 | — | 12 h/210° C. |
| S9 | — | 12 h/210° C. |
| S10 | — | 12 h/210° C. |
| S11 | — | 12 h/210° C. |
| S12 | — | 12 h/210° C. |
| S13 | — | 12 h/210° C. |
| S14 | — | 12 h/210° C. |
| S15 | — | 12 h/210° C. |
| S16 | — | 12 h/210° C. |
| S17 | — | 12 h/210° C. |
| S20 | — | 12 h/210° C. |
| S21 | — | 12 h/210° C. |
| S22 | — | 12 h/210° C. |

TABLE 5

| Sample | Reactant | Water content | Particle size [nm] | BET [m$^2$/g] |
|---|---|---|---|---|
| S20 | Ti(O$^i$Pr)$_4$ | <0.1% | 4 | — |
| S21 | Ti$_7$O$_4$(OEt)$_{20}$ | <0.1% | 6 | 144 |
| S22 | Ti$_7$O$_4$(OEt)$_{20}$ | 2% | 11 | 153 |

The invention claimed is:

1. A method for producing nanoscale particles, comprising:
    a) preparing a composition consisting essentially of a hydrolyzable metal compound, at least one ionic liquid, and at least one compound having at least one hydroxyl group, wherein a water content of the at least one compound having at least one hydroxyl group is between 0.1 and 10%, measured in % by weight;
    b) treating the composition under heat and superatmospheric pressure; and
    c) isolating the nanoscale particles, wherein the ionic liquid is a liquid at a temperature below 100° C.

2. The method as claimed in claim 1, wherein the at least one ionic liquid is re-used.

3. The method as claimed in claim 1, wherein the ratio, measured in mmol, of the hydrolyzable metal compound to the ionic liquid is between 10:1 and 1:10.

4. The method as claimed in claim 3, wherein the ratio, measured in mmol, of the hydrolyzable metal compound to the at least one ionic liquid is between 1.5:1 and 5:1.

5. The method as claimed in claim 1, wherein the hydrolyzable metal compound is a compound of the formula $$MX_n$$

where M is selected from the group consisting of Mg, B, Al, Ga, In, Si, Ge, Sn, Pb, Y, Ti, Zr, V, Nb, Ta, Mo, W, Fe, Cu, Ag, Zn, Cd, Ce, and La, and n corresponds to the valence of the metal, and X represents a hydrolyzable group.

6. The method as claimed in claim 1, wherein the at least one ionic liquid is a liquid with the formula $K^+A^-$ where $K^+$ is selected from the group consisting of ammonium, phosphonium, uronium, thiouronium, guanidinium cations and heterocyclic cations and $A^-$ is selected from the group consisting of halides, acetates, phosphates, phosphinates, aluminates, borates, sulfates, sulfonates, imides, amides and cyanates.

7. The method as claimed in claim 1, wherein the at least one compound having at least one hydroxyl group has a boiling point of below 200° C.

8. The method as claimed in claim 1, wherein the at least one compound having at least one hydroxyl group is a lower aliphatic alcohol comprising a $C_1$-$C_6$ alcohol.

9. A method for preparing a precursor compound for the hydrothermal production of nanoscale particles, comprising:
   a) preparing a composition consisting essentially of a hydrolyzable metal compound, at least one ionic liquid, and at least one compound having at least one hydroxyl group, wherein a water content of the at least one compound having at least one hydroxyl group is 10%, measured in % by weight;
   b) treating the composition under reflux; and
   c) isolating the precursor compound, wherein the ionic liquid is a liquid at a temperature below 100° C.

10. The method as claimed in claim 1, wherein the water content of the at least one compound having at least one hydroxyl group is between 0.1 and 2 wt. %.

11. The method as claimed in claim 1, wherein the at least one ionic liquid comprises 1-n-butyl-3-methylimidazolium chloride, 1-n-hexyl-3-methylimidazolium chloride, 1-methyl-3-n-octylimidazolium chloride, 1-n-butyl-3-methylimidazolium bromide, 1-n-hexyl-3-methylimidazolium bromide, 1-methyl-3-n-octylimidazolium bromide, 1-n-butyl-3-methylimidazoliumtetrafluoroborate, 1-n-hexyl-3-methylimidazoliumtetrafluoroborate, 1-methyl-3-n-octylimidazoliumtetrafluoroborate, 1-n-butyl-3-methylimidazoliumhexafluorophosphate, 1-n-hexyl-3-methylimidazoliumhexafluorophosphate, 1-methyl-3-n-octylimidazoliumhexafluorophosphate, 1-n-butyl-3-methylimidazolium bis(trifluoromethanesulfonyl)imide, 1-n-hexyl-3-methylimidazolium bis(trifluoromethanesulfonyl)imide, 1-methyl-3-n-octylimidazolium bis(trifluoromethanesulfonyl)imide, 1-n-butyl-3-methylimidazolium methylsulfonate, 1-n-hexyl-3-methylimidazolium methylsulfonate, 1-methyl-3-n-octylimidazolium methylsulfonate, 1-n-butyl-3-methylimidazolium methylsulfate, 1-n-hexyl-3-methylimidazolium methylsulfate, 1-methyl-3-n-octylimidazolium methylsulfate, 1-n-butyl-3-methylimidazolium triflate, 1-n-hexyl-3-methylimidazolium triflate, or 1-methyl-3-n-octylimidazolium triflate.

12. The method as claimed in claim 1, wherein the at least one ionic liquid comprises a liquid with the formula $K^+A^-$ wherein $K^+$ comprises a heterocyclic cation corresponding to the formula $[HetN]^+$.

13. The method as claimed in claim 12, wherein the heterocyclic cation is selected from the group containing imidazolium, 1H-pyrazolium, 3H-pyrazolium, 4H-pyrazolium, 1-pyrazolinium, 2-pyrazolinium, 3-pyrazolinium, 2,3-dihydroimidazolinium, 4,5-dihydroimidazolinium, 2,5-dihydroimidazolinium, pyrrolidinium, 1,2,4-triazolium, 1,2,3-triazolium, pyridinium, pyridazinium, pyrimidinium, piperidinium, morpholinium, pyrazinimium, thiazolium, oxazolium, indolium, quinolinium, isoquinolinium, quinoxalinium, and indolinium.

* * * * *

UNITED STATES PATENT AND TRADEMARK OFFICE
CERTIFICATE OF CORRECTION

| | |
|---|---|
| PATENT NO. | : 9,126,848 B2 |
| APPLICATION NO. | : 13/517266 |
| DATED | : September 8, 2015 |
| INVENTOR(S) | : de Oliveira et al. |

It is certified that error appears in the above-identified patent and that said Letters Patent is hereby corrected as shown below:

On the Title page, Item (73), Assignee:

Change "Leibniz-Insitut fuer Neue Marterialien gemeinnuetzige GmbH, Saarbrueken (DE)"

to

--Leibniz-Institut fuer Neue Materialien gemeinnuetzige GmbH, Saarbruecken (DE)--

Signed and Sealed this
Fifteenth Day of March, 2016

Michelle K. Lee
*Director of the United States Patent and Trademark Office*